United States Patent
Bian et al.

(10) Patent No.: US 11,822,122 B2
(45) Date of Patent: Nov. 21, 2023

(54) WAVEGUIDE STRUCTURES

(71) Applicant: GLOBALFOUNDRIES U.S. INC., Malta, NY (US)

(72) Inventors: Yusheng Bian, Ballston Lake, NY (US); Ajey Poovannummoottil Jacob, Watervliet, NY (US); Steven M. Shank, Jericho, VT (US)

(73) Assignee: GLOBALFOUNDRIES U.S. INC., Malta, NY (US)

( * ) Notice: Subject to any disclaimer, the term of this patent is extended or adjusted under 35 U.S.C. 154(b) by 0 days.

(21) Appl. No.: 17/462,491

(22) Filed: Aug. 31, 2021

(65) Prior Publication Data

US 2021/0396929 A1 Dec. 23, 2021

Related U.S. Application Data

(62) Division of application No. 16/549,466, filed on Aug. 23, 2019, now Pat. No. 11,163,114.

(51) Int. Cl.
  *G02B 1/00* (2006.01)
  *G02B 6/122* (2006.01)
  *G02B 6/125* (2006.01)
  *G02B 6/12* (2006.01)

(52) U.S. Cl.
  CPC ........... *G02B 6/1225* (2013.01); *G02B 1/002* (2013.01); *G02B 1/005* (2013.01); *G02B 6/125* (2013.01); *G02B 2006/1213* (2013.01); *G02B 2006/12061* (2013.01); *G02B 2006/12147* (2013.01)

(58) Field of Classification Search
  CPC ...... G02B 1/002; G02B 1/005; G02B 6/1225; G02B 6/125; G02B 2006/12061; G02B 2006/1213; G02B 2006/12147
  See application file for complete search history.

(56) References Cited

U.S. PATENT DOCUMENTS

| 5,526,449 | A | 6/1996 | Meade | G02B 6/1225 385/14 |
| 6,542,654 | B1 | 4/2003 | Miller | B82Y 20/00 385/122 |
| 6,674,949 | B2 | 1/2004 | Allan | G02B 6/3538 385/129 |
| 7,012,946 | B2 * | 3/2006 | Kim | G02B 6/1225 372/92 |

(Continued)

OTHER PUBLICATIONS

Hibbins et al.,"Waveguide arrays as plasmonic metamaterials: transmission below cutoff",School of Physics, University of Exeter, Feb. 2006, 5 pages.

(Continued)

*Primary Examiner* — Ryan A Lepisto
(74) *Attorney, Agent, or Firm* — Francois Pagette; Andrew M. Calderon; Calderon Safran & Cole P.C.

(57) ABSTRACT

The present disclosure relates to semiconductor structures and, more particularly, to waveguide structures with metamaterial structures and methods of manufacture. The structure includes: at least one waveguide structure; and metamaterial structures separated from the at least one waveguide structure by an insulator material, the metamaterial structures being structured to decouple the at least one waveguide structure to simultaneously reduce insertion loss and crosstalk of the at least one waveguide structure.

10 Claims, 7 Drawing Sheets

(56) References Cited

U.S. PATENT DOCUMENTS

| | | | | |
|---|---|---|---|---|
| 7,228,042 | B2* | 6/2007 | McNab | B82Y 20/00 385/27 |
| 7,418,161 | B2* | 8/2008 | Mouli | G02B 6/1225 385/39 |
| 7,421,179 | B1 | 9/2008 | Jiang | B82Y 20/00 385/129 |
| 7,428,348 | B2 | 9/2008 | Prather | B82Y 20/00 385/129 |
| 7,545,242 | B2* | 6/2009 | Beausoliel | G06F 1/10 333/248 |
| 7,783,139 | B2 | 8/2010 | Noda | G02B 6/14 385/11 |
| 8,258,892 | B2* | 9/2012 | Abhari | B82Y 20/00 333/135 |
| 8,600,200 | B1* | 12/2013 | Rakich | G02F 1/0126 385/7 |
| 9,091,807 | B2* | 7/2015 | Dos Santos Fegadolli | G02B 6/1228 |
| 9,268,092 | B1* | 2/2016 | Jarecki, Jr. | G02F 1/125 |
| 9,696,492 | B1* | 7/2017 | Cox | G02F 2/004 |
| 10,036,905 | B2 | 7/2018 | Ouyang | H01P 1/383 |
| 10,283,689 | B2 | 5/2019 | Hussein | H01L 35/30 |
| 10,333,044 | B2 | 6/2019 | Hussein | H01L 35/04 |
| 2002/0146196 | A1 | 10/2002 | Shirane | G02F 1/025 385/16 |
| 2003/0123827 | A1* | 7/2003 | Salerno | B82Y 20/00 385/27 |
| 2008/0212921 | A1 | 9/2008 | Gaylord et al. | |
| 2017/0047499 | A1 | 2/2017 | Hussein | H01L 35/30 |
| 2019/0086579 | A1 | 3/2019 | Kim | G02B 5/005 |

OTHER PUBLICATIONS

Bing Shen et al.,"Metamaterial-waveguide bends with effective bend radius < λ0/2", Department of Electrical and Computer Engineering, University of Utah, Optics letter, final version published Nov. 2015, 5 pages.

Zhong Lei Mei et al.,"Experimental realization of a broadband bend structure using gradient index metamaterials", vol. 17, No. 20 / Optics Express, Sep. 2009, 10 pages.

Saman Jahani et al.,"Controlling evanescent waves using silicon photonic all-dielectric metamaterials for dense integration", Nature Communications | (2018) 9:1893, 9 pages.

Ruben Maas et al.,"Experimental realization of an epsilon-near-zero metamaterial at visible wavelengths", Department of Electrical and Systems Engineering, University of Pennsylvania,Nature Photonics, Oct. 2013, 7 pages.

Yusheng Bian et al.,"Efficient Cross-talk Reduction of Nanophotonic Circuits Enabled by Fabrication Friendly Periodic Silicon Strip Arrays", www.nature.com/scientificreports, Scientific reports/ 7:15827/, Nov. 2017, 9 pages.

* cited by examiner

WAVEGUIDE STRUCTURES

FIELD OF THE INVENTION

The present disclosure relates to semiconductor structures and, more particularly, to waveguide structures with metamaterial structures and methods of manufacture.

BACKGROUND

Semiconductor optical waveguide structures (e.g., photonic components) are an important component of integrated optoelectronic systems. For example, a semiconductor optical waveguide structure is capable of guiding optical waves (e.g., light) with minimal loss of energy by restricting expansion of the light into the surrounding substrate. The optical waveguide structure can be used in many different applications including, e.g., semiconductor lasers, optical filters, switches, modulators, isolators, and photodetectors. The use of semiconductor material also enables monolithic integration into optoelectronic devices using known fabrication techniques.

In waveguide arrays, crosstalk occurs between waveguide structures, i.e., between adjacent parallel or orthogonal waveguide channels. In the orthogonal waveguide structures, for example, multi-mode interference and self-imaging mechanisms are provided at a crossing of planar waveguide structures to reduce the crosstalk and any loss. On the other hand, in parallel waveguide structures, it is possible to enlarge the separation between adjacent waveguide structures, but the footprint and the packaging density are compromised. Also, waveguide bends can be used, but it is difficult to realize significant loss reduction by introducing non-constant curvatures.

SUMMARY

In an aspect of the disclosure, a structure comprises: at least one waveguide structure; and metamaterial structures separated from the at least one waveguide structure by an insulator material, the metamaterial structures being structured to decouple the at least one waveguide structure to simultaneously reduce insertion loss and crosstalk of the at least one waveguide structure.

In an aspect of the disclosure, a structure comprises: a plurality of planar and parallel waveguide structures; and metamaterial structures separated from the plurality of planar and parallel waveguide structures by an insulator material, the metamaterial structures being at least one of above, below and on a same level of the plurality of planar and parallel waveguide structures.

In an aspect of the disclosure, a structure comprises: a curved waveguide structure; and metamaterial structures separated from the curved waveguide structure by an insulator material, the metamaterial structures being structured to reduce insertion loss and crosstalk of the curved waveguide structure.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to semiconductor structures and, more particularly, to waveguide structures with metamaterial structures and methods of manufacture. More specifically, the present disclosure provides waveguide structures with different combinations of metamaterial configurations. Advantageously, the use of metamaterial structures enables decoupling of the waveguide structures resulting in simultaneous reduction of insertion loss and crosstalk, compared to typical planar arrays of waveguide structures. More specifically, the use of metamaterial structures with waveguide structures in different configurations will provide significant reduction of the crosstalk between waveguide channels, while also providing low insertion loss and significant improvement of packing density.

In embodiments, an array of metamaterial structures can be arranged adjacent to the waveguide structure for control of evanescent waves, wherein the array is arranged in plane with the waveguide structure in the same plane or above or below the waveguide layer. By implementing the waveguide structures with different combinations of metamaterial configurations it is possible to reduce the inter-channel crosstalk by about 5 dB reduction, compared to typical waveguide structures which do not implement the use of the different metamaterial combinations described herein. Further reduction is possible through optimization of the metamaterial configuration to further control evanescent waves, which is also associated with the dimension and confinement of the waveguide channel. In addition, by implementing the configurations described herein, bending loss can be reduced to −1.4 dB, providing an improved transmission to >70%. Further reduction is possible through optimization of the configuration of the metamaterial structures to further control the tails of the evanescent waves supported by the bends of the waveguide structures.

The waveguide structures of the present disclosure can be manufactured in a number of ways using a number of different tools. In general, though, the methodologies and tools are used to form structures with dimensions in the micrometer and nanometer scale. The methodologies, i.e., technologies, employed to manufacture the waveguide structures of the present disclosure have been adopted from integrated circuit (IC) technology. For example, the structures are built on wafers and are realized in films of material patterned by photolithographic processes on the top of a wafer. In particular, the fabrication of the waveguide structures use three basic building blocks: (i) deposition of thin films of material on a substrate, (ii) applying a patterned mask on top of the films by photolithographic imaging, and (iii) etching the films selectively to the mask.

Figure 1:
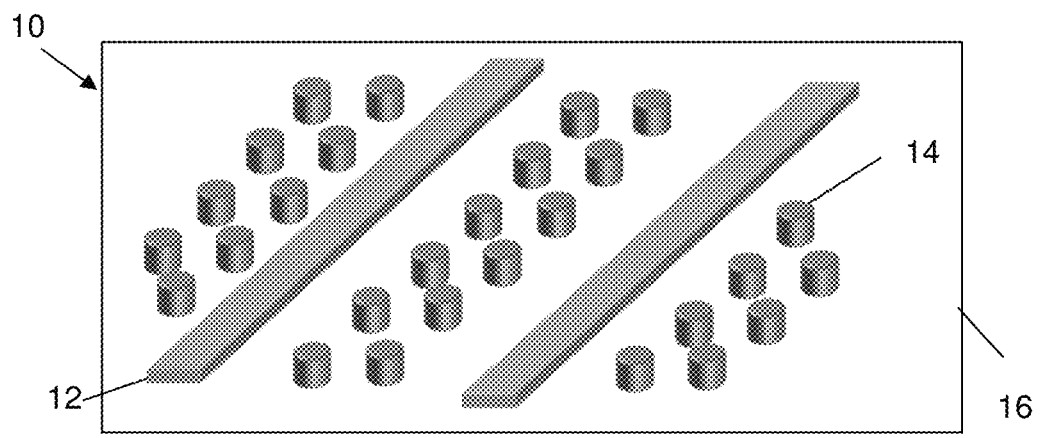
FIG. 1 shows waveguide structures with metamaterial structures, amongst other features, in accordance with aspects of the present disclosure.

FIG. 1 shows waveguide structures with metamaterial structures, amongst other features, in accordance with aspects of the present disclosure. Specifically, the structure 10 shown in FIG. 1 includes parallel (and straight) waveguide structures 12 with metamaterial structures 14 between the waveguide structures 12. As in each of the embodiments, the waveguide structures 12 are planar and do not touch one another and, preferably, are separated by insulator material 16, e.g., oxide material. In further embodiments, the metamaterial structures 14 can be separated by air gaps between the metamaterial structures.

In FIG. 1, for example, the waveguide structures 12 and the metamaterial structures 14 are formed at a same level (in plane) using the same semiconductor material and, preferably, silicon-on-insulator material as described further in FIGS. 11A-11E. In alternative embodiments, the waveguide structures 12 can be composed of any semiconductor material which is suitable for reflecting and propagating optical signals with minimal loss. For example, the waveguide structures 12 and metamaterial structures 14 can be composed of Si. As described in more detail, the waveguide structures 12 and metamaterial structures 14 can also be different combinations of Si and SiN.

Still referring to FIG. 1, the metamaterial structures 14 are comprised of an array of cylinders patterned between and around the waveguide structures 12. In alternative embodiments, the metamaterial structures 14 can be an array of rods or other geometric shapes. For example, the metamaterial structures 14 can be cubes, cuboids, etc., patterned from SiN (or Si material). The individual geometric shapes of the metamaterial structures 14 can be of the same size and pitch or of a different size and pitch, depending on the designed performance parameters of the waveguide structures 12. For example, as in any of the embodiments described herein, the dimension (radius) of individual metamaterial structures 14 (e.g., rods) can be approximately $0.01*\lambda$ to $0.45*\lambda$ and the dimension of the waveguide structures 12 can be approximately $0.15*\lambda$ to $8*\lambda$, with a gap or waveguide separation of approximately $0.05*\lambda$ to $3*\lambda$. In further embodiments, the metamaterial structures 14 can be separated by air gaps between the metamaterial structures.

Figure 2:
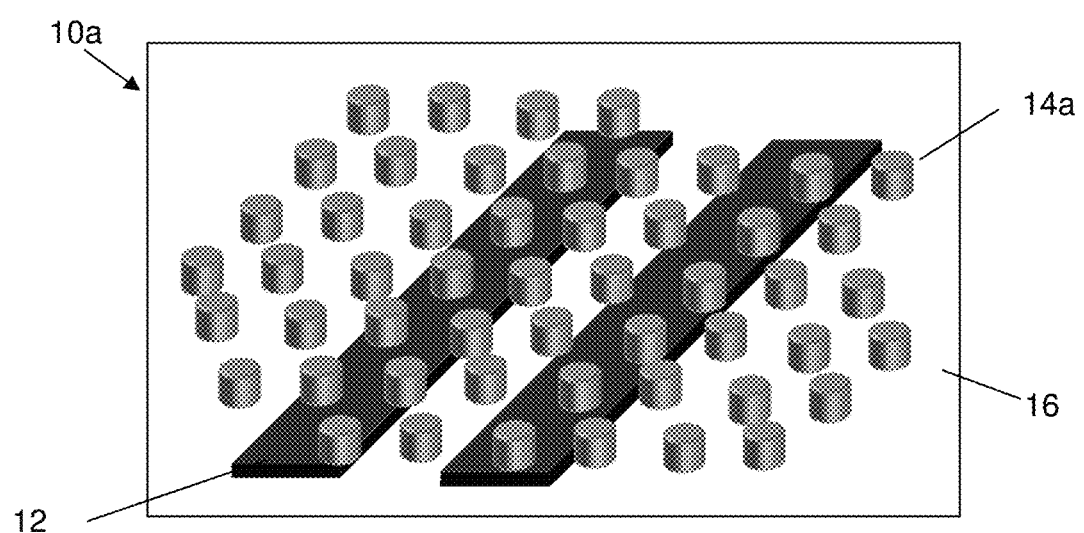
FIG. 2 shows waveguide structures with metamaterial structures, amongst other features, in accordance with additional aspects of the present disclosure.

FIG. 2 shows waveguide structures with metamaterial structures in accordance with additional aspects of the present disclosure. In the structure 10a of FIG. 2, the waveguide structures 12 are composed of silicon-on-insulator material and the metamaterial structures 14a are be composed of SiN. In this implementation, the silicon-on-insulator material is provided on a lower (e.g., first) level of the device and the SiN metamaterial structures 14a is provided above or on an upper level of the device. As described with respect to FIG. 1, the metamaterial structures 14 can be formed from any geometric shape, e.g., rod, cylinder, cube, etc. The waveguide structures 12 and metamaterial structures 14 do not touch one another and, preferably, are separated by insulator material 16, e.g., oxide material. In further embodiments, the metamaterial structures 14 can be separated by air gaps between the metamaterial structures.

Figure 3:
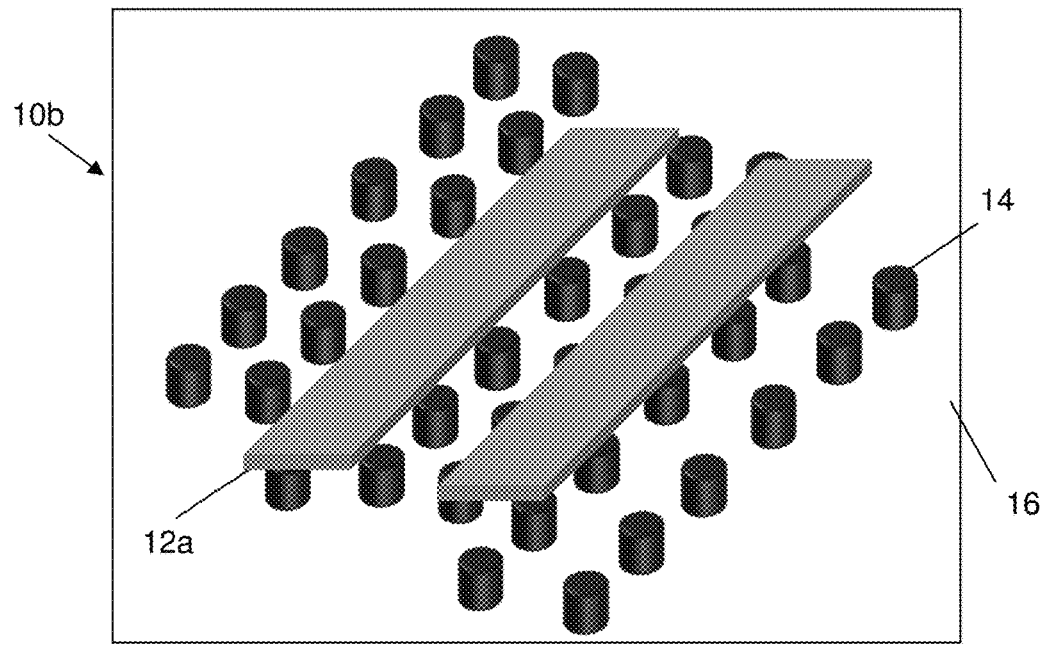
FIG. 3 shows waveguide structures with metamaterial structures, amongst other features, in accordance with additional aspects of the present disclosure.

FIG. 3 shows waveguide structures with metamaterial structures in accordance with yet additional aspects of the present disclosure. In the structure 10b of FIG. 3, the metamaterial structures 14 can be composed of silicon-on-insulator material and the waveguide structures 12a can be composed of SiN. In this implementation, the metamaterial structures 14 are provided on a lower level of the device, whereas, the waveguide structures 12a are provided above and/or on an upper level of the device. As described with respect to FIG. 1, the metamaterial structures 14 can be formed from any geometric shape. Further, as in each of the embodiments, the waveguide structures 12a and metamaterial structures 14 do not touch one another and, preferably, are separated by insulator material 16, e.g., oxide material. In further embodiments, the metamaterial structures 14 can be separated by air gaps between the metamaterial structures.

Figure 4:
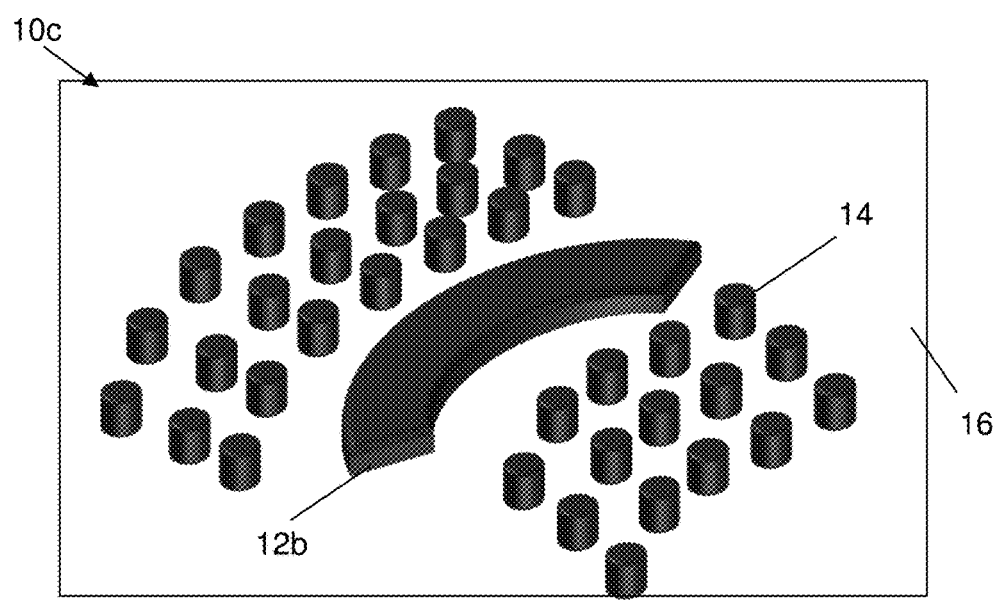
FIG. 4 shows waveguide structures with metamaterial structures, amongst other features, in accordance with additional aspects of the present disclosure.

In the structure 10c of FIG. 4, the metamaterial structures 14 and the waveguide structure 12b are composed of silicon-on-insulator material, on a same level (in plane) of the device. In this embodiment, though, the waveguide structure 12b is bent or has a curvature, with the metamaterial structures 14 on both sides (e.g., opposing side) of the waveguide structure 12b. In embodiments, the metamaterial structures 14 can completely or partially surround the waveguide structure 12b.

As in each of the embodiments showing curved or bent waveguide structures, it should be understood by those of ordinary skill in the art that the waveguide structure 12b can extend from an end of any of the parallel (and straight) waveguide structures 12 of FIG. 1, for example. Moreover, as described with respect to FIG. 1, the metamaterial structures 14 can be any geometric shape. Also, as in each of the embodiments, the waveguide structure 12b and metamaterial structures 14 do not touch one another and, preferably, are separated by insulator material 16, e.g., oxide material. In further embodiments, the metamaterial structures 14 can be separated by air gaps between the metamaterial structures.

Figure 5:
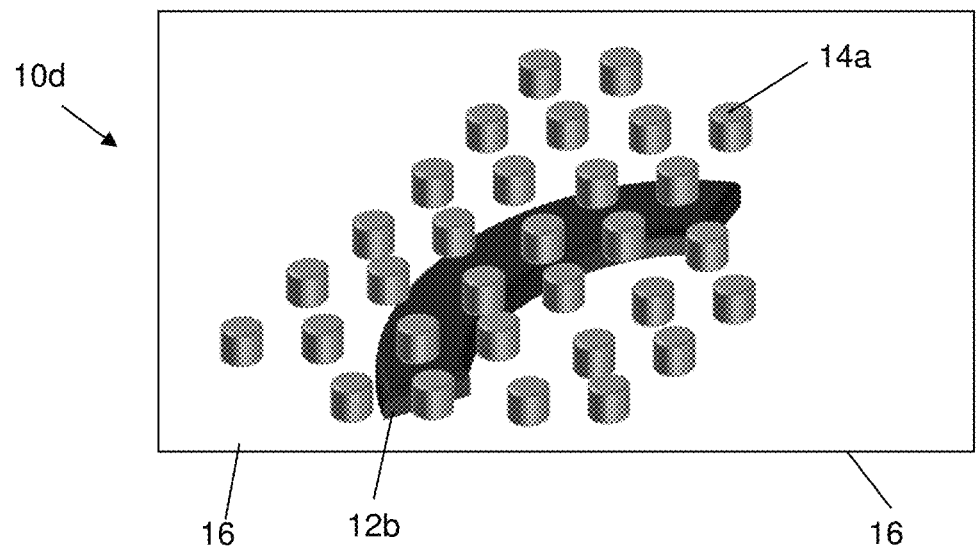
FIG. 5 shows waveguide structures with metamaterial structures, amongst other features, in accordance with additional aspects of the present disclosure.

In FIG. 5, the structure 10d includes metamaterial structures 14a composed of SiN material and the waveguide structure 12b composed of silicon-on-insulator material, on a lower level. In this embodiment, the waveguide structure 12b is bent or has a curvature, with the metamaterial structures 14a above the waveguide structure 12b. As described with respect to FIG. 1, the metamaterial structures 14a can be any geometric shape. Also, as in each of the embodiments, the waveguide structure 12b and metamaterial structures 14a do not touch one another and, preferably, are separated by insulator material 16, e.g., oxide material. In further embodiments, the metamaterial structures 14a can be separated by air gaps between the metamaterial structures.

Figure 6:
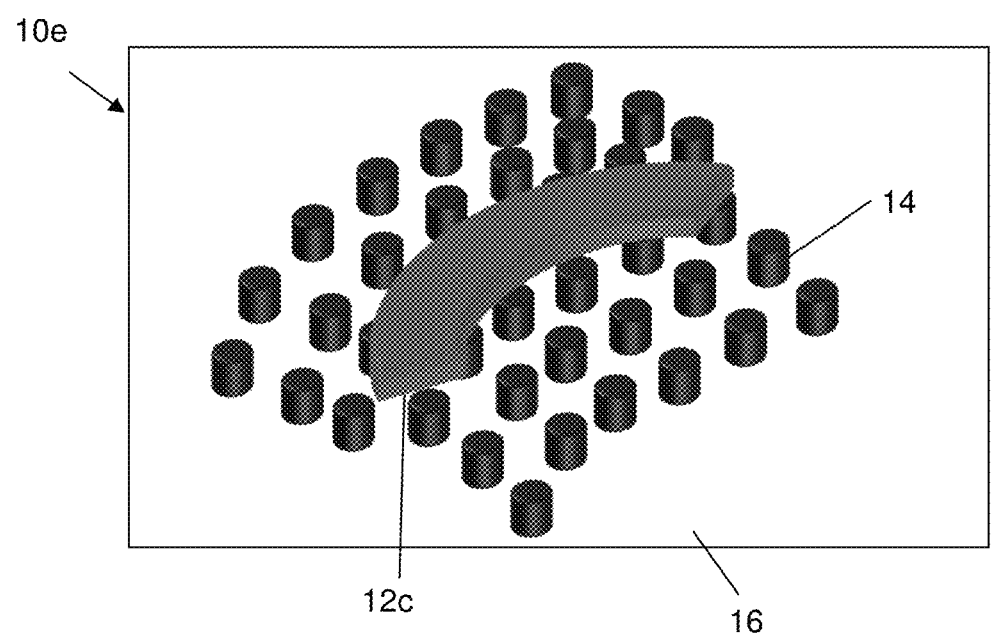
FIG. 6 shows waveguide structures with metamaterial structures, amongst other features, in accordance with additional aspects of the present disclosure.

In FIG. 6, the structure 10e includes the metamaterial structures 14 composed of silicon-on-insulator material and the waveguide structure 12c composed of SiN material, on an upper level. In this embodiment, the waveguide structure 12c is bent or has a curvature, with the metamaterial structures 14 below the waveguide structure 12c. As described with respect to FIG. 1, the metamaterial structures 14 can be any geometric shape. Also, as in each of the embodiments, the waveguide structure 12c and metamaterial structures 14 do not touch one another and, preferably, are separated by insulator material 16, e.g., oxide material. In further embodiments, the metamaterial structures 14 can be separated by air gaps between the metamaterial structures.

Figure 7:
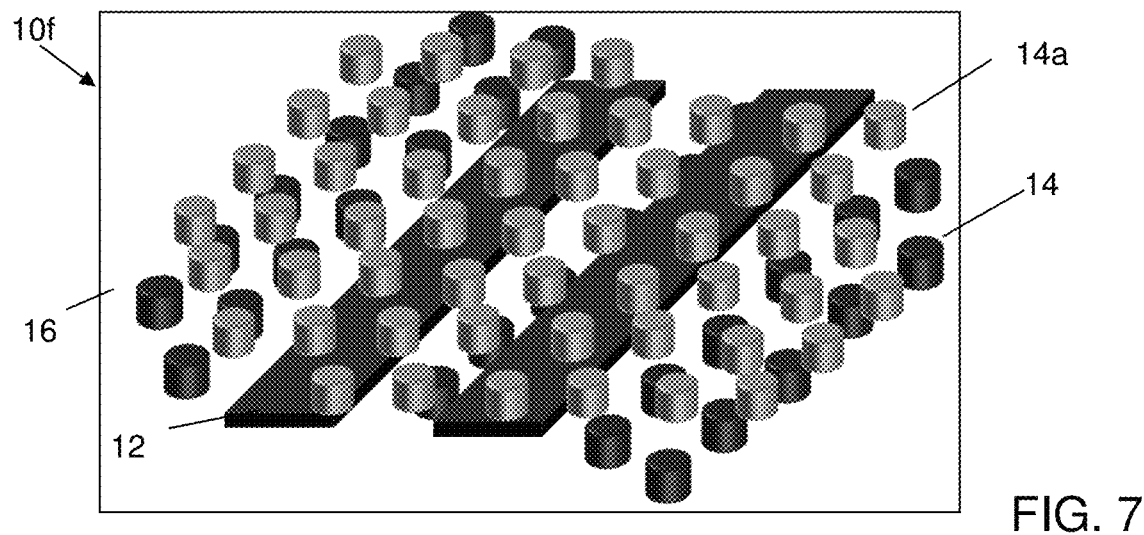
FIG. 7 shows waveguide structures with metamaterial structures, amongst other features, in accordance with additional aspects of the present disclosure.

In FIG. 7, the structure 10f includes parallel (and straight) waveguide structures 12 with metamaterial structures 14 between the waveguide structures 12 and metamaterial structures 14a formed above the waveguide structures 12. In this embodiment, the waveguide structures 12 and metamaterial structures 14a are composed of the same material, e.g., silicon-on-insulator material; whereas, the metamaterial structures 14a are composed of a different material, e.g., SiN material, above the waveguide structures 12 and metamaterial structures 14. In embodiments, the waveguide structures 12 and metamaterial structures 14, 14a do not touch one another and, preferably, are separated by insulator material 16, e.g., oxide material. As further shown in FIG. 7, the waveguide structures 12 are planar waveguide structures and the metamaterial structures 14, 14a can be any geometric shape. In further embodiments, the metamaterial structures 14, 14a can be separated by air gaps between the metamaterial structures.

Figure 8:
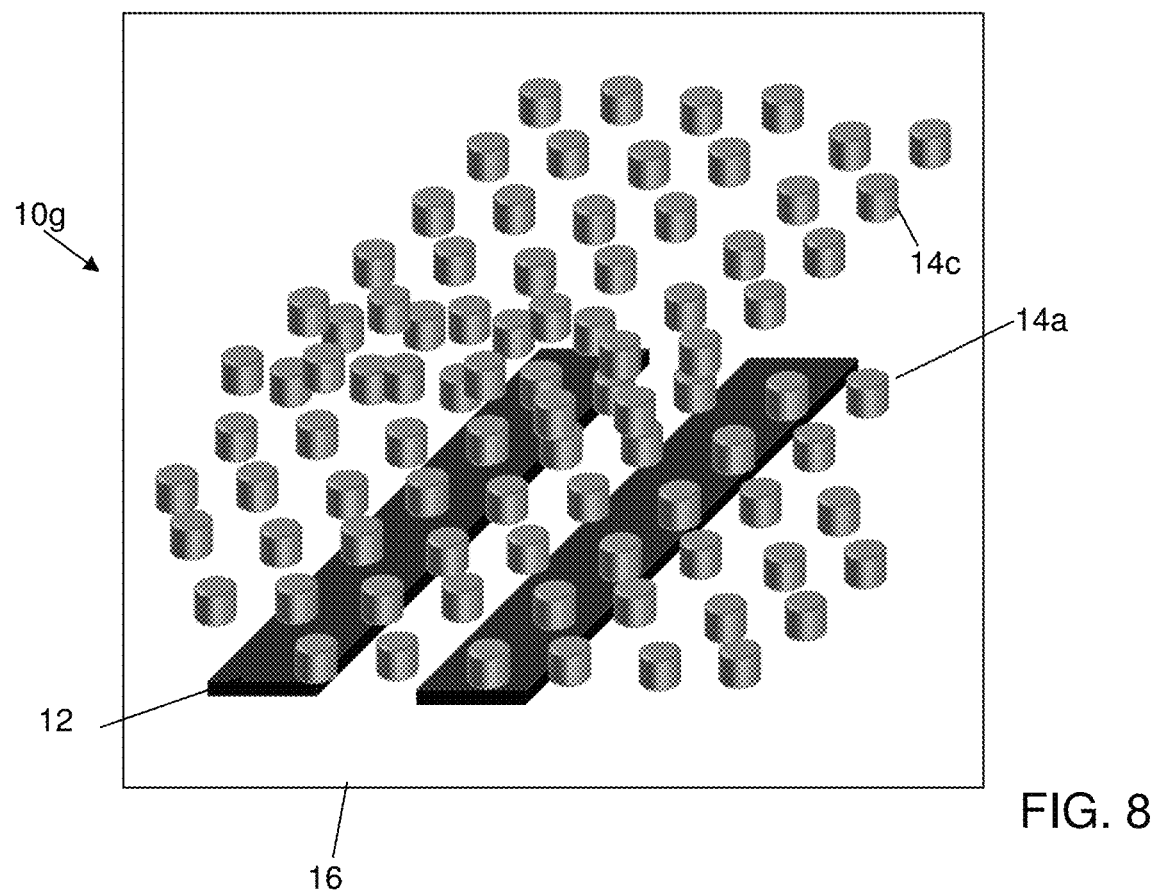
FIG. 8 shows waveguide structures with metamaterial structures, amongst other features, in accordance with additional aspects of the present disclosure.

In FIG. 8, the structure 10g includes parallel (and straight) waveguide structures 12 with two levels of metamaterial 14a, 14c above the waveguide structures 12. In this embodiment, the waveguide structures 12 are composed of, e.g., silicon-on-insulator material; whereas, the metamaterial structures 14a, 14c are composed of a different material, e.g., SiN material, above the waveguide structures 12. In embodiments, the metamaterial structures 14a, 14c are formed on different levels above the waveguide structures 12. In further embodiments, the waveguide structures 12 and metamaterial 14a, 14c do not touch one another and, preferably, are separated by insulator material 16, e.g., oxide material. As further shown in FIG. 8, the waveguide structures 12 are planar waveguide structures and the metamaterial structures 14a, 14c can be any geometric shape. In further embodiments, the metamaterial structures 14, 14c can be separated by air gaps between the metamaterial structures.

Figure 9:
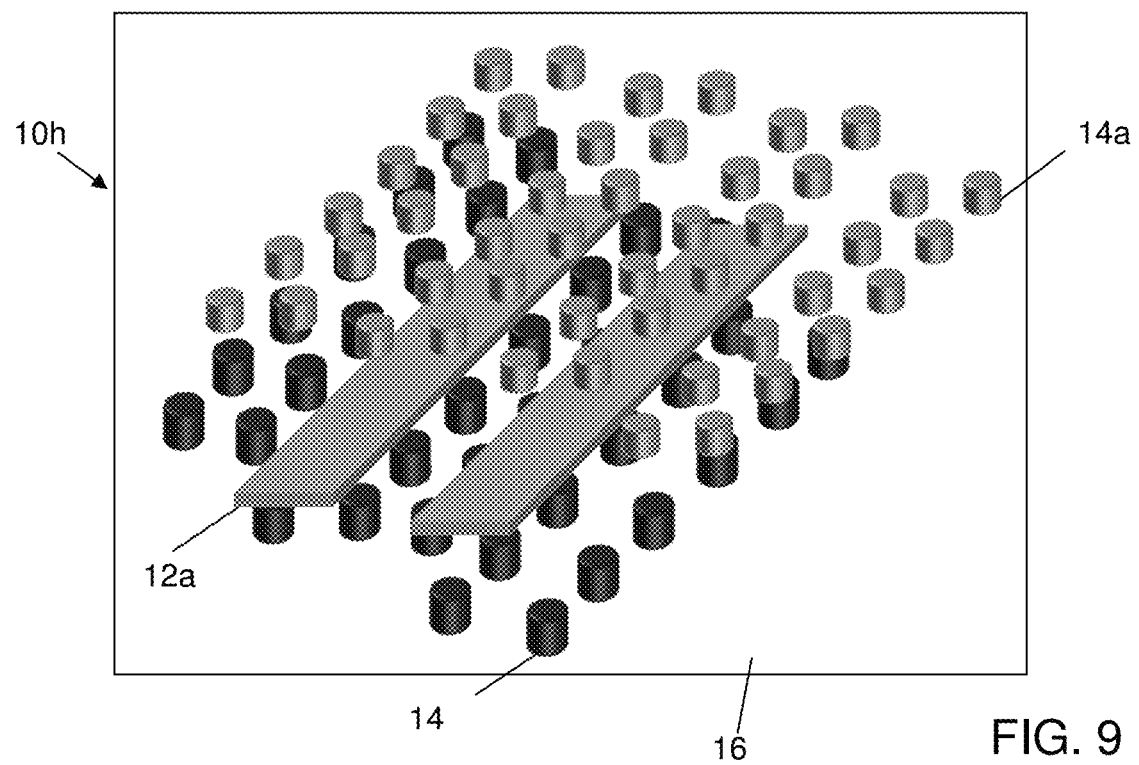
FIG. 9 shows waveguide structures with metamaterial structures, amongst other features, in accordance with additional aspects of the present disclosure.

In FIG. 9, the structure 10h includes parallel (and straight) waveguide structures 12a with metamaterial structures 14, 14a above and below the waveguide structures 12a. In this embodiment, the metamaterial structures 14 are composed of, e.g., silicon-on-insulator material; whereas, the waveguide structures 12a and the metamaterial structures 14a are composed of a different material, e.g., SiN material, above the metamaterial structures 14. In embodiments, the waveguide structures 12a and the metamaterial structures 14a can be on a same or different level, composed of the same material, e.g., SiN. For example, as shown in FIG. 9, the metamaterial structures 14a are shown to be formed above the waveguide structures 12a. In further embodiments, the waveguide structures 12a and metamaterial structures 14, 14a do not touch one another and, preferably, are separated by insulator material 16, e.g., oxide material. As further shown in FIG. 9, the waveguide structures 12a are planar waveguide structures and the metamaterial structures 14, 14a can be any geometric shape. In further embodiments, the metamaterial structures 14, 14a can be separated by air gaps between the metamaterial structures.

Figure 10:
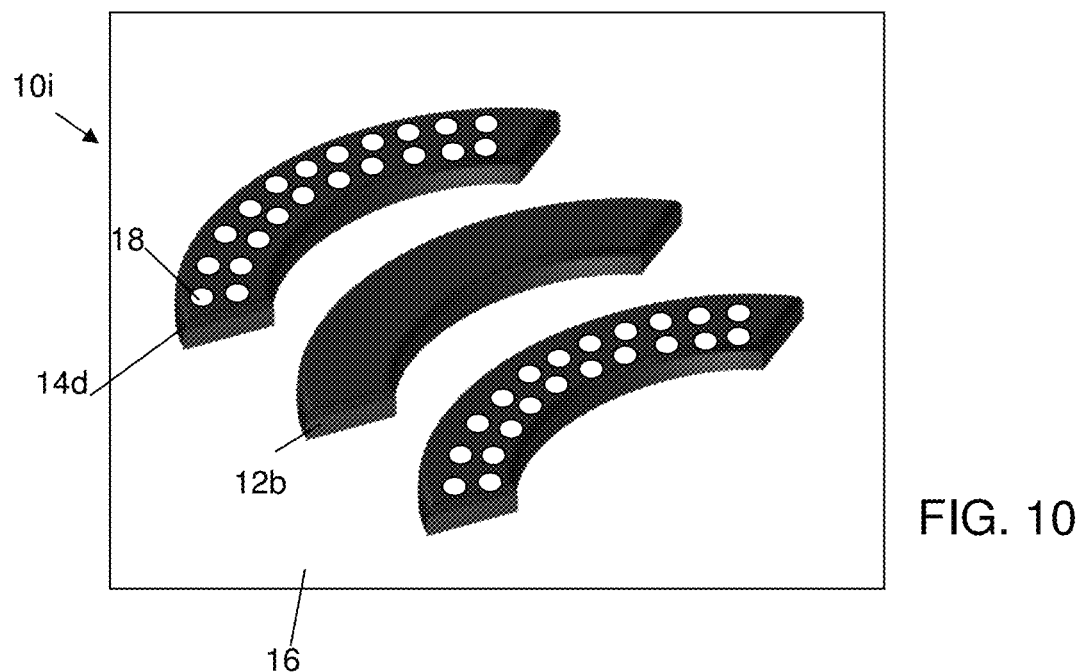
FIG. 10 shows waveguide structures with metamaterial structures, amongst other features, in accordance with additional aspects of the present disclosure.

As shown in FIG. 10, the structure 10i includes curved or bent waveguide structures 12b and metamaterial structures 14d are composed of silicon-on-insulator material, on a same level (in plane) of the device. It is contemplated that the curved or bent waveguide structures 12b and metamaterial structures 14d can be composed of Si material. In this embodiment, the metamaterial structures 14d are bent and are provided with holes or openings 18, which are fabricated using conventional lithography and etching processes. The openings 18 can be filled with insulator material 16. Moreover, in this embodiment, the metamaterial structures 14d are provided on both sides of the waveguide structure 12b and, preferably, have the same radius of curvature as the waveguide structure 12b.

As in each of the embodiments showing curved or bent waveguide structures, it should be understood by those of ordinary skill in the art that the waveguide structure 12b can extend from an end of any of the parallel (and straight) waveguide structures 12. Also, as in each of the embodiments, the waveguide structure 12b and metamaterial structures 14d do not touch one another and, preferably, are separated by insulator material 16, e.g., oxide material.

Figure 11A:
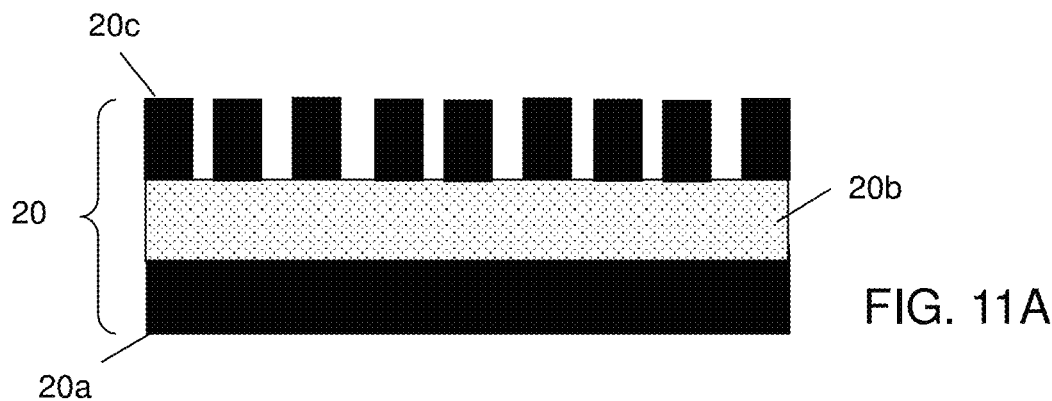
FIGS. 11A-11E show illustrative fabrication processes of forming a waveguide structure with metamaterial structures in accordance with aspects of the present disclosure.

FIGS. 11A-11E show illustrative fabrication processes of forming a waveguide structure with metamaterial structures in accordance with aspects of the present disclosure. As shown in FIG. 11A, a semiconductor-on-insulator wafer 20 comprises a wafer 20a, an insulator material 20b on the wafer 20a and semiconductor material 20c on the insulator material 20b. The insulator material 20b is a buried oxide layer (BOX). The semiconductor material 20c can be patterned using conventional lithography and etching processes to form the waveguide structures and/or the metamaterial structures. The conventional lithography and etching processes can also be used for form openings (e.g., openings 18) in the waveguide structures.

By way of example, in FIG. 11A, a resist formed over the material 20c is exposed to energy (light) to form a pattern (opening). An etching process with a selective chemistry, e.g., reactive ion etching (RIE), will be used to the patterned material (e.g., semiconductor material to form the waveguide structures 12, 12b, 14d and/or the metamaterial structures 14 through the openings of the resist. The resist can then be removed by a conventional oxygen ashing process or other known stripants.

Figure 11B:
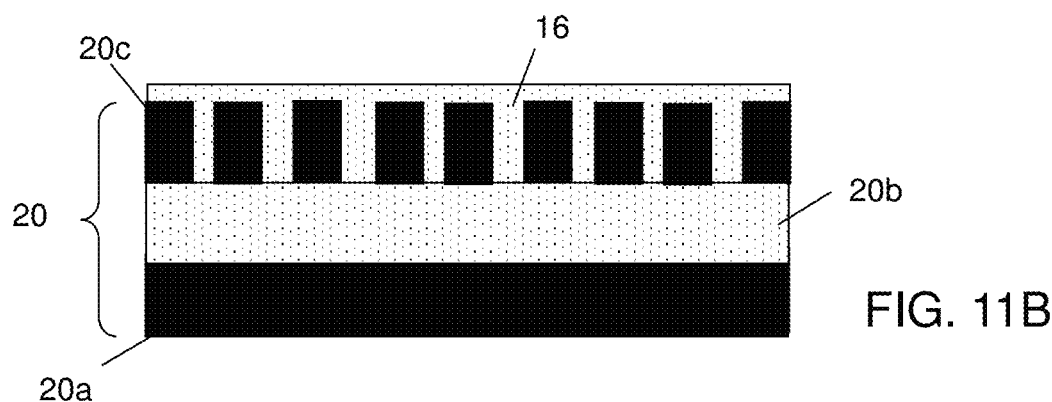

As shown in FIG. 11B, following the resist removal, insulator material 16 is deposited over the patterned semiconductor material, e.g., guide structures 12, 12b, 14d and/or the metamaterial structures 14. The insulator material 16 can be an oxide material deposited by any conventional deposition processes, e.g., CVD processes.

Figure 11C:
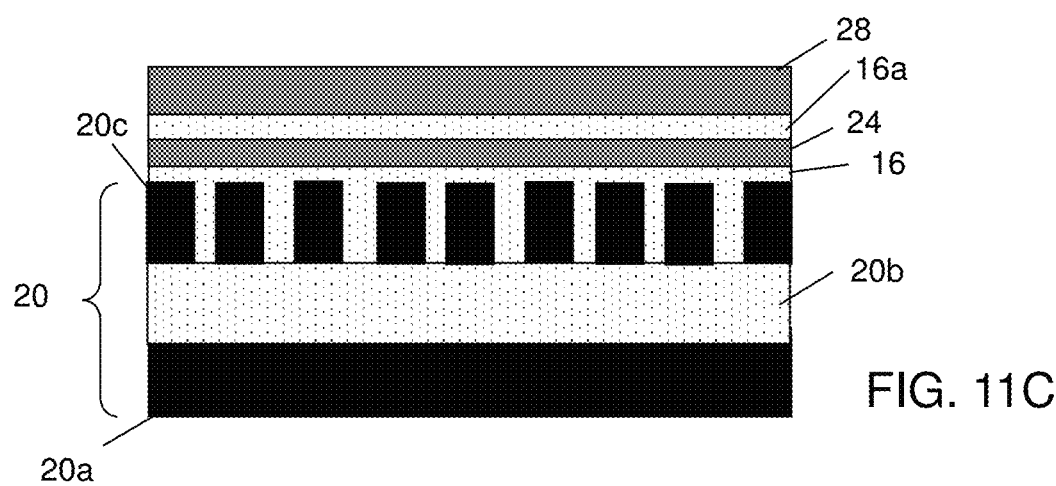
Figure 11D:
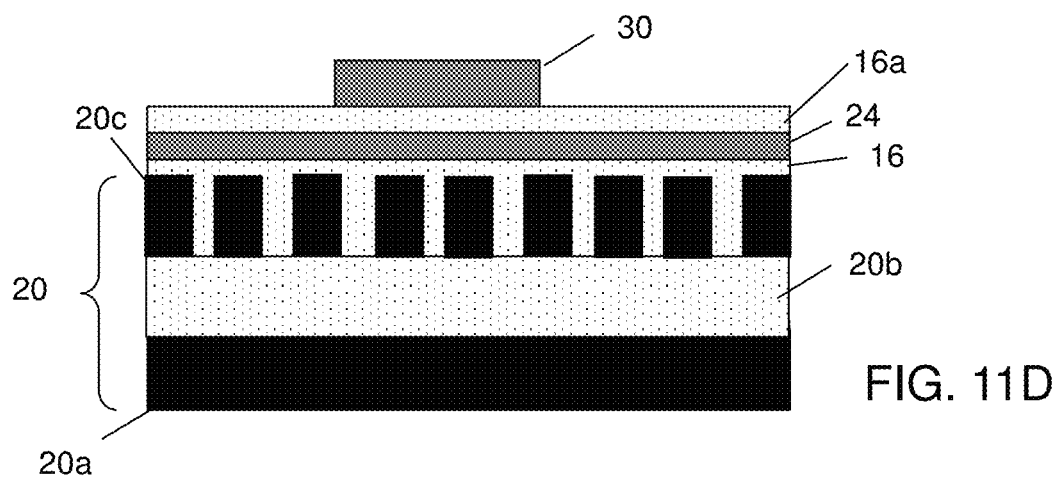
Figure 11E:
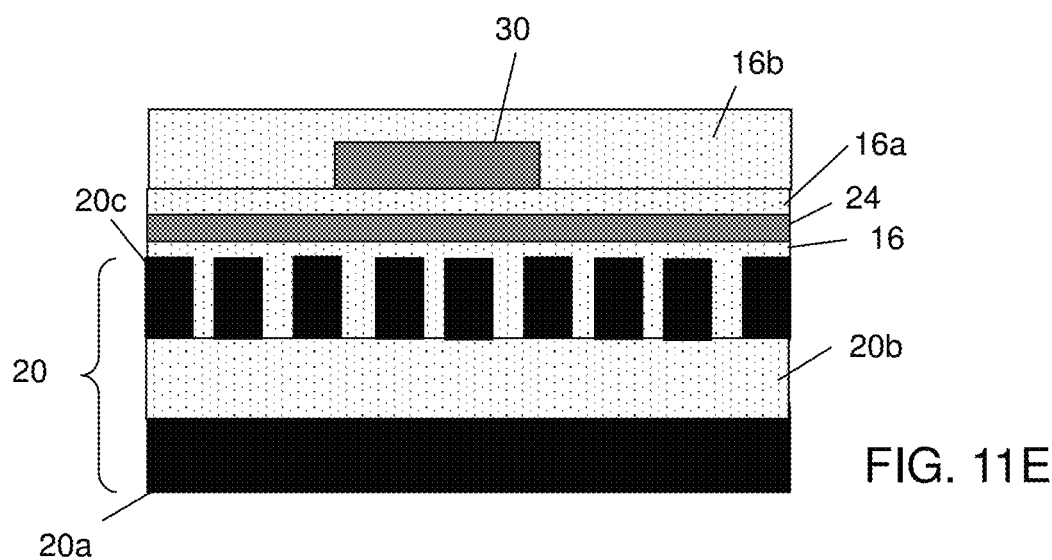

In FIG. 11C, appropriate semiconductor material (SiN) 24 is deposited on the insulator material 16, over the patterned waveguide structures 12, 12b, 14d and/or the metamaterial structures 14. The semiconductor material 24 can be deposited by any conventional deposition process, e.g., CVD processes. Further insulator material 16a and semiconductor material (SiN) 28 can be deposited on the semiconductor material 24. Thereafter, as shown in FIG. 11D, the semiconductor material (SiN) 28 can be patterned to form structure 30 using conventional lithography and etching processes as described herein. As should be understood by those of skill in the art, the structure 30 can be fabricated into the waveguide structures 12b and/or the metamaterial structures 14a, 14c, depending on the embodiment described above. In FIG. 11E, insulator material 16b is deposited over the patterned semiconductor material 30. The insulator material 16 can be an oxide material deposited by any conventional deposition processes, e.g., CVD processes. In embodiments, the insulator material 16 can be representative of back end of the line (BEOL) structures.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure comprising:
a plurality of waveguide structures; and
metamaterial structures separated from the plurality of waveguide structures by an insulator material, the metamaterial structures being structured to decouple the plurality of waveguide structures to simultaneously reduce insertion loss and crosstalk of the plurality of waveguide structures; and
additional metamaterial structures above the plurality of waveguide structures and which are composed of different material than the metamaterial structures and the plurality of waveguide structures.

2. The structure of claim 1, wherein the plurality of waveguide structures is a plurality of planar waveguide structures in parallel to one another and the metamaterial structures are composed of geometric shapes provided between the plurality of planar waveguide structures.

3. The structure of claim 2, wherein the plurality of planar waveguide structures and the metamaterial structures are composed of a same material on a same level of a device.

4. The structure of claim 3, wherein the plurality of planar waveguide structures and the metamaterial structures are composed of Si or SiN material.

5. A structure comprising:
at least one waveguide structure; and
metamaterial structures separated from the at least one waveguide structure by an insulator material, the metamaterial structures being structured to decouple the at least one waveguide structure to simultaneously reduce insertion loss and crosstalk of the at least one waveguide structure,
wherein the metamaterial structures are on opposing sides of the at least one waveguide structure, and
wherein the metamaterial structures are above and at a same level as the at least one waveguide structure.

6. The structure of claim 1, wherein the plurality of planar waveguide structures are parallel to one another and the metamaterial structures are composed of geometric shapes provided above the plurality of planar waveguide structures.

7. The structure of claim 6, wherein the plurality of planar waveguide structures and the metamaterial structures are composed of different material on a different level of a device.

8. The structure of claim 6, wherein the metamaterial structures are geometric shapes provided in two levels, each of which are above the plurality of planar waveguide structures.

9. A structure comprising:
a waveguide structure; and
metamaterial structures separated from the waveguide structure by an insulator material, the metamaterial structures being structured to reduce insertion loss and crosstalk of the waveguide structure,
wherein the metamaterial structures are above and at the same level as the waveguide structure, and the metamaterial structures above the waveguide structure are composed of different materials and the metamaterial structures at the same level of the waveguide structure are of a same material.

10. The structure of claim 5, wherein the at least one waveguide structure and the metamaterial structures are of different materials.

* * * * *